Feb. 11, 1958        L. A. PUGGARD        2,823,003

CONNECTING MEANS FOR TRIPOD-SUPPORTED DEVICES

Filed Jan. 25, 1954        2 Sheets-Sheet 1

INVENTOR.
LOUIS A. PUGGARD
BY
ATTORNEY.

Feb. 11, 1958   L. A. PUGGARD   2,823,003
CONNECTING MEANS FOR TRIPOD-SUPPORTED DEVICES
Filed Jan. 25, 1954   2 Sheets-Sheet 2

INVENTOR.
LOUIS A. PUGGARD
BY Gregory S. Dolgorukov
ATTORNEY.

United States Patent Office 2,823,003
Patented Feb. 11, 1958

2,823,003

CONNECTING MEANS FOR TRIPOD-SUPPORTED DEVICES

Louis A. Puggard, Detroit, Mich.

Application January 25, 1954, Serial No. 405,782

3 Claims. (Cl. 248—186)

This invention relates to a connector or coupling intended for connecting tripod-supported devices such as photographic cameras, surveying instruments, and the like, to tripod heads.

In the use of tripod-supported devices, particularly photographic cameras, great difficulties have been experienced in connecting such devices to tripod heads in a manner that would ensure proper results and be dependable and secure in operation. A tripod is usually equipped with a device known in the trade as "tripod head" which is, in effect, a universal joint permitting rotation of the camera around a vertical axis and around a horizontal axis and thus enabling the operator to aim and focus the camera on a desired object. A tripod head usually includes two portions, a lower portion connected to the tripod legs and an upper portion connected to such lower portion with the aid of a mechanism ensuring universal action or movement of the upper portion. Various mechanisms, such as two perpendicular shafts, ball-and-socket, and similar mechanisms are employed.

A camera is usually connected to the upper portion of the tripod head with the aid of a screw having a head bearing on such upper portion and having a shank projecting upwardly and entering a tapped hole in the camera bottom. In spite of the fact that heads of such screws are made relatively large and are knurled, reaching and tightening them is inconvenient, and the screw often becomes loose, producing undesirable movements of the camera, not only affecting the results obtainable with the camera or even ruining the pictures, but also presenting a danger of cameras falling off the tripod heads. Setting up a camera and attaching it to the tripod head with such a screw is often very inconvenient, since such a camera may be relatively heavy and starting it on the screw thread requires manipulating it and turning the screw holding the camera from falling off. This may require walking around the tripod, the legs of which may be set relatively far apart. Performing such an operation under many conditions such as in insufficient light, in cold and wind, may be most inconvenient and may result in dropping the camera and severely damaging the same. More-over setting up the camera with the aid of such a connecting device takes considerable time and often results in the subject-matter to be photographed moving away or changing its position to an extent making taking of the picture impossible or undesirable. In consequence thereof, many photographers attempt to carry their cameras already attached to the tripod for relatively long distances, putting the tripod over the shoulder. While this may be done without much difficulty when moving of the camera has to be done through a short distance, carrying around a camera already attached to the tripod may be very inconvenient and undesirable under many conditions.

One of the objects of the present invention is to provide improved means for connecting a tripod-supported device such as a photographic camera to the tripod head, whereby the above difficulties and disadvantages are overcome and largely eliminated.

Another object of the invention is to provide an improved coupling for connecting a photographic camera to a tripod head whereby such camera can be attached to the tripod head in a speedy and reliable manner without the necessity of operating a screw and catching the threads of the tapped holes and, therefore, without bearing the inconvenience or consequences of such an operation.

A further object of the present invention is to provide an improved coupling for connecting a tripod-supported device, such as a camera, to a tripod head, means being provided whereby connection or attachment of the camera to the tripod head is so strong and dependable that no loosening of such connection is probable in operation.

A still further object of the present invention is to provide an improved coupling for connecting a tripod-supported device such as a camera to a tripod head, whereby attaching of such device to the tripod head, is made in an exceedingly simple and quick manner and merely by pushing it into a simple jaw or lip recess, wherein it goes with a snap, and tightening a large knurled nut on a screw already in engagement, which screw need not be started on its thread.

A further object of the present invention is to provide an improved camera, means being provided on the camera structure whereby it can be attached to a tripod in a manner specified above.

A still further object of the present invention is to provide an improved tripod head, means being provided whereby it can be connected to a camera or a similar device in a manner referred to above.

A still further object of the present invention is to provide a coupling or connector adapted to be used with cameras and tripods already in the field, with the aid of which their present screw-and-tapped-hole connection is changed to the connection embodying the present invention.

It is an added object of the present invention to provide an improved coupling for connecting a tripod-supported device to a tripod head, which coupling or connector is simple and rugged in construction, dependable in operation and is relatively inexpensive to manufacture.

Further objects and advantages of this invention will be apparent from the following description and appended claims, reference being had to the accompanying drawings forming a part of this specification, wherein like reference characters designate corresponding parts in the several views.

Figure 1:
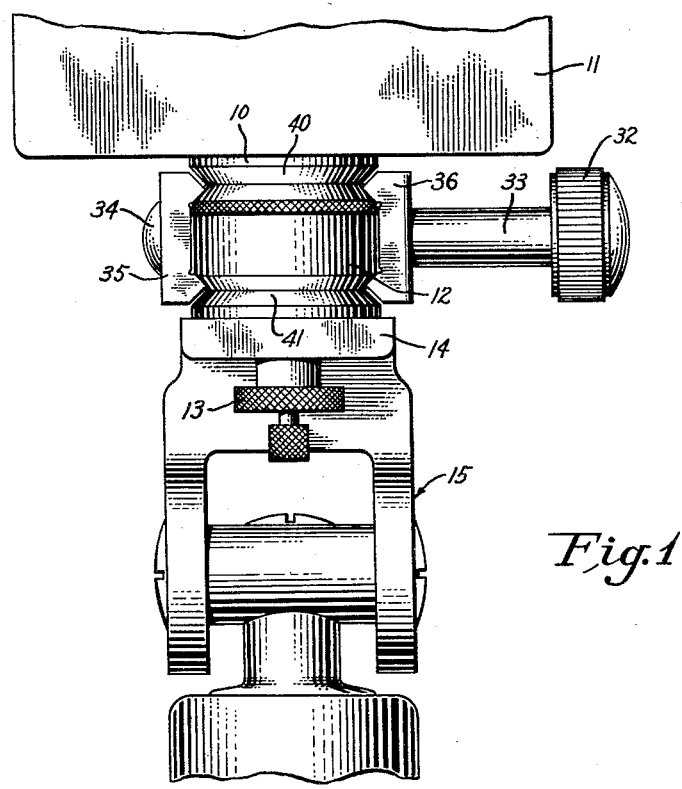
Fig. 1 is an elevational view showing the top of a tripod with a head and a camera connected thereto with the aid of connecting means embodying the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention I discard the former practice of attaching a camera, or some other tripod-supported device, to the tripod head with the aid of a screw connection which has to be separated when the camera is taken off the tripod and has to be connected again for attaching the camera to the tripod head, with the necessity of starting the screw threads on, i. e., produce engagement of the separated screw threads. In accordance with the invention I use two frictional clutch members complementary to each other, one of them provided on the camera bottom and the other on the tripod head, said means being adapted to engage each other when the camera is put in place for connecting to the tripod head. Further, I provide means adapted to press the clutch members together and hold them in locking frictional engagement. In the embodiment of the invention illustrated in the drawings said means are in the form of cams operated with the aid of threaded means. However, said threaded means remain in engagement even after the camera is separated from the tripod, and, therefore, do not require starting the thread on for connecting the camera to the tripod head. The cam means include a spring holding them in operative positions and are of such a nature that they are carried by one of the clutch members and provide a nest adapted to receive the other clutch member which enters into such nest with a snap. By virtue of such a construction, securing a camera on the tripod requires merely putting it in place and operating the thread means to lock the clutch members in frictional engagement.

The frictional clutch members may be made integral with the camera and with the tripod head, respectively, and the cam means may be carried by either of them. Also, one or both clutch members may be made connectable to the camera or to the tripod head, respectively.

In order to incorporate my improved connecting means, into cameras and similar devices already in the field, I also provide a coupling forming a self-sustaining unit and susceptible of being distributed as a separate article of manufacture, and in which the upper clutch member may be connected to the camera with the aid of means such as a screw adapted to engage a tapped hole provided in the camera bottom. On the other hand, the lower clutch member of such a connector or coupling is provided with a tapped hole and is connectable to the tripod head with the aid of the screw provided on such head and used in conventional practice to engage the camera. I provide a bolt for actuating the cam means and to perform a number of other functions explained below and particularly to serve as a handle by which the device may be securely tightened to the tripod head. The coupling is heavily knurled and can be tightened to the tripod head and to the camera so strongly that it cannot unscrew in operation. Such tightening of the respective portions of the device to the camera and to the tripod head does not present any inconvenience in operation, since after tightening is need not be separated every time the camera has to be taken off the tripod.

In the drawings there are shown, by way of example, my improved connecting means for connecting a tripod-supported device to the tripod head. Said means are illustrated and described below with reference to a photographic camera. It will be understood, however, that said means are applicable for use in connection with other tripod-supported devices, as mentioned.

Figure 2:
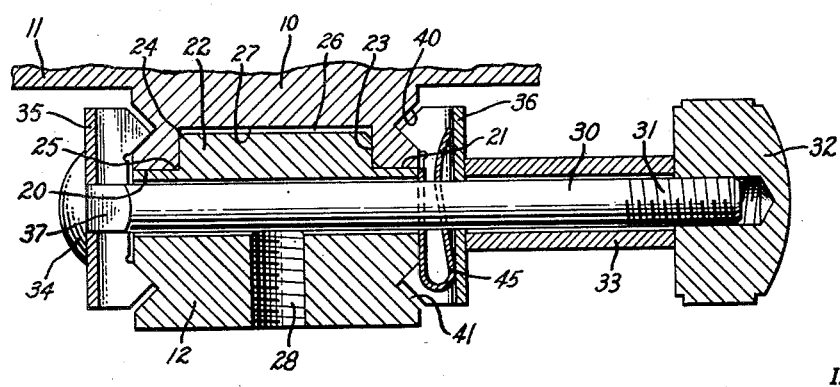
Fig. 2 is a sectional view taken on the section plane passing through the vertical axis of the connector, the latter being shown removed from the tripod head.
Figure 3:
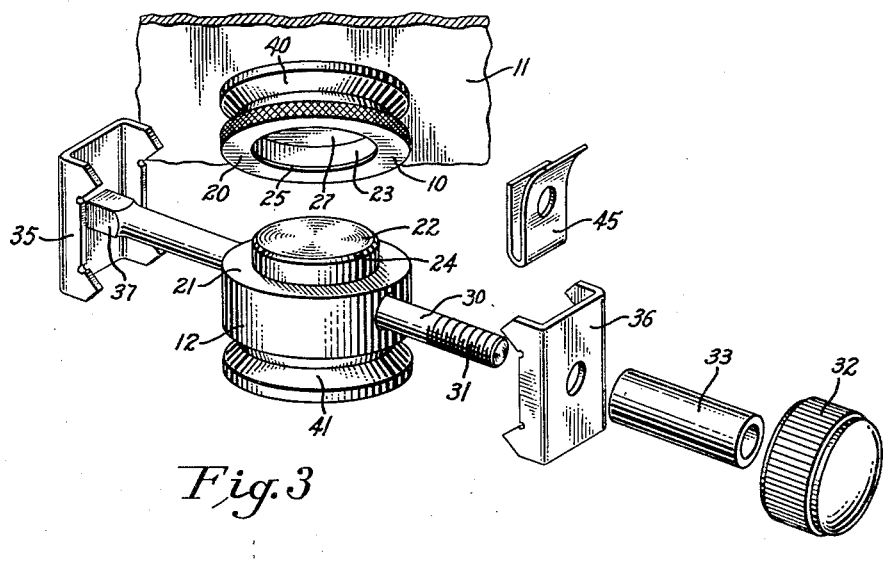
Fig. 3 is an exploded view showing in perspective the separate parts of the construction of Fig. 2.

Referring specifically to Figs. 1-3, the connecting means illustrated therein include an upper clutch member 10 formed on the bottom of the camera 11, while the lower clutch member 12 is detachably connected with the aid of a screw 13 to the flange 14 of the tripod head 15.

The tripod head provides for rotation of the camera about two perpendicular axes and thus, constitutes, in effect, a universal joint. Since the tripod head such as shown in Fig. 1 does not form, per se, a part of the present invention, no further description thereof is deemed necessary herein. The clutch members 10 and 12 have frictional contact surfaces 20 and 21 adapted to be in locking frictional engagement when the members are pushed together by an extraneous force. A boss 22 is provided on the member 12 and is adapted to enter into the recess 23 provided in the member 10 and thus to locate the clutch members 10 and 11 in proper axial alignment. Chamfers 24 and 25 are provided on the edges of the boss 22 and on the member 10, respectively, to facilitate entering of the boss 22 into the recess 23. Sufficient clearance 26, see Fig. 2, is provided between the top of the boss 22 and the bottom 27 of the member 10 to prevent interference of the boss with the proper contact of the surfaces 20 and 21. The lower clutch member is provided with a tapped hole 28, see Fig. 2, at which the screw 13 of the tripod engages said member 12.

Means are provided to hold the clutch members 10 and 12 together in a locking frictional engagement, and to release them selectively. In the present embodiment of the invention said means are exemplified by a bolt having a shank 30 passing through a diametrical hole provided in the member 12. The end of the bolt shank is threaded as shown at 31 and carries a knurled nut 32 bearing against the end of a sleeve 33. Between the head 34 of the bolt and the sleeve 33 there are provided on both sides of the clutch members two cam members 35 and 36 each having two sets of cams adapted to enter into two circumferential grooves 40 and 41 provided in members 10 and 12, respectively.

The members 35 and 36 are supported by the shank 30 of the bolt passing through the holes in said members. The hole in the member 35 is of square outline and cooperates with the portion 37 of the shank under the head 34 to prevent rotation of the bolt when operating the nut 32.

As the nut 32 is rotated in the direction to screw it on the shank 30, it bears against the sleeve 33 pushing therethrough on the cam member 36 forcing the cams thereof into the grooves 40 and 41. At the same time the nut 32 pulls on the head 34 and pushes the cam member 35 also into the grooves 40 and 41. Thus, the cams of the cam members 35 and 36 are pushed into the grooves on both sides of the clutch members. The angles of the grooves 40 and 41 as well as the angles on the cams are so selected that pushing the cam members toward the axis of the coupling causes them to draw the clutch members 10 and 12 together, bringing the surfaces 20 and 21 into locking frictional engagement.

On the other hand, rotating the nut 32 in the opposite direction, screws the nut 32 off the shank, releasing its pressure on the sleeve 33 and on the cam members 35 and 36. In consequence thereof, a spring 45 causes the cam member 36 and the sleeve 33 to move as far outwardly as permitted by the nut 32, but holding the cam member 35 to have its cams still in the grooves 40 and 41. When the cam member 36 moves outwardly until the ends of its cams are sufficiently out of the groove 40, the camera 11 may be removed from the tripod, since under such conditions the upper clutch member can be taken out of its engagement with the cam members 35 and 36.

When connecting the camera to the tripod is again required, the upper clutch member 10 is placed on the downwardly slanted ends of the cams and pressed down. Under such conditions, the cam member 36 tilts on the shank 33 compressing the spring 45, permitting entry of the lower portion of the clutch member 10 into the nest formed by the four cams of the members 35 and 36, and causing its recess 23 to engage the bosses 22 and the upper cams of the members 35 and 36 to enter the groove 40. Thereupon, all that is necessary to secure the camera to the tripod head is to operate the nut 32 to screw it on the shank 30 and thus to lock the clutch frictional members together. The above operation is performed simply and quickly. The upper clutch member is merely placed on the cams and pushed down. It enters into the recess with a click, and several turns of the nut 32 secures the camera to the tripod head. It should be appreciated that the mechanical advantage obtained with the aid of the nut 32 and cam members 35 and 36, as well as with the aid of the frictional surfaces 20 and 21 of relatively large mean diameter, produces frictional locking grip that is greatly superior to the unreliable grip produced by a mere screw. It should also be appreciated that the nut 32 remains in constant engagement with the threaded end 31 of the shank 30, i. e., it engages the threaded end of the bolt irrespective of the fact whether the camera is attached to the tripod head or is taken off. Therefore, no starting of the threads is necessary, in consequence whereof the difficulties connected with such starting, particularly if the end of one of the threads is damaged, are totally eliminated. Loosening the nut 32 through a portion of a turn releases the clutch members for relative rotation to permit "panning" of the camera with frictional resistance that may be regulated with the aid of said nut 32.

Figure 6:
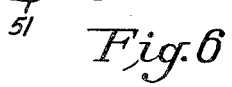
Fig. 6 is a sectional view showing a connector such as that shown in Figs. 1 and 2 but with the lower member of the connector being made integral with the tripod head.

It will be understood that the lower clutch member such as member 12 of the construction of Figs. 1–3 may be integrally formed on the tripod head and thus constitute a part thereof. Such a construction is shown in Fig. 6, wherein the lower clutch member 50 is made integral with the tripod head 51. In other respects the member 50 may be similar in its construction to the member 12.

Figure 4:
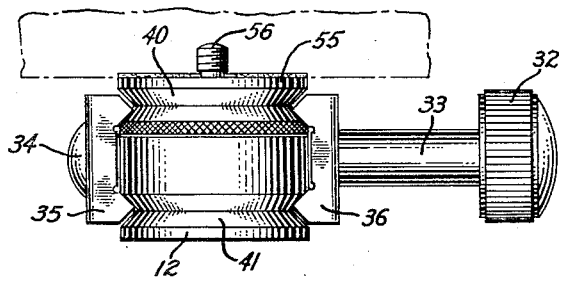
Fig. 4 is an elevational view of a connector or coupling adapted to be used on tripods and cameras already in the field.
Figure 5:
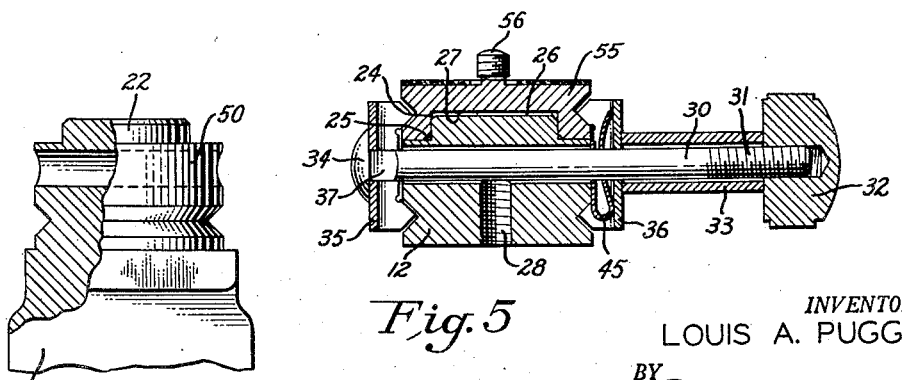
Fig. 5 is a sectional view of the device of Fig. 4 taken on the plane passing through the vertical axis of the device.

Figs. 4 and 5 show a construction which differs from the construction of Figs. 1–3 in that the upper member 55 thereof is made detachable from the camera. With the aid of such a construction the connector or coupling, such as illustrated in Figs. 4 and 5 presents a self-sustained unit which may be sold separately and be used on cameras and tripods already in the field. As is shown in Figs. 4 and 5, the clutch member 55 of the coupling is provided with a screw 56 adapted to enter into a tapped hole in the camera bottom intended for connecting screws such as the screw 13 of the tripod head 15. In other respects the construction of the coupling is similar to that described with reference to the construction of Figs. 1–3. With the connector or coupling of Figs. 4 and 5, in order to effect a connection between a tripod head and a camera, the coupling is first separated and the member 55 is screwed tightly to the camera. A fiber washer provided on the member 55 improves the contact of the upper surfaces of the member 55 with the bottom surface of the camera, ensuring better frictional lock and preventing galling of the contact surfaces. The coarse knurling on the member 55 permits such tightening by hand. However, any suitable tool may also be used for this purpose. The lower member 12 of the coupling is screwed on the flange 14 of the tripod head with the aid of the screw 13. The camera is then ready to be connected to the tripod head in a manner described above.

The coupling shown in Figs. 4 and 5 can be easily and inexpensively made on an automatic screw machine from any suitable material, as aluminum, and finished to present a pleasing appearance. The nut 32 may be made of plastic material of suitable color, such as black or of a color matching the color of the camera.

Practical use of my improved connector such as illustrated in Figs. 4 and 5 shows that it possesses in full measure the advantages explained above and thus attains the objects of the invention listed above. It is rugged in construction and is dependable in use, thus adding greatly to the convenience of using photographic cameras and preventing not only annoyances in operation but also saving cameras, which are expensive equipment, from damage.

By virtue of the above disclosed constructions, the objects of the present invention and numerous additional advantages are attained.

I claim:

1. A coupling for connecting a camera to a tripod head, said coupling comprising a lower clutch member adapted to be secured to a tripod head, an upper clutch member complementary to said lower clutch member and adapted to be in operative engagement therewith, said upper clutch member being adapted to be secured to the camera, means on said clutch members to keep them in axial alignment, a circumferential groove on each of said clutch members, two cam members each spanning the joint between the clutch members and having two cams, one of the two cams of each cam member engaging in the groove of one clutch member and the other cam of each cam member engaging in the groove of the other clutch member to draw said clutch members together into a locking engagement, a bolt passing diametrically through one of said members and supporting said cam members on said clutch member, and a nut for said bolt adapted when operated to push the cams of said cam members into said grooves and thus to draw said members into a locking engagement.

2. The coupling defined in claim 1 and provided with a spring supported by said bolt and tending to draw one of said members out of the grooves.

3. The coupling defined in claim 1, with said clutch members being provided with threaded connections to tripod head and the camera, respectively, said bolt extending radially at least on one side of the coupling to serve as a handle for operating said threaded elements.

References Cited in the file of this patent

UNITED STATES PATENTS

| | | |
|---|---|---|
| 1,679,758 | Bauerseld et al. | Aug. 7, 1928 |
| 1,857,847 | Heinemann | May 10, 1932 |
| 2,013,293 | Sneall et al. | Sept. 3, 1935 |
| 2,546,395 | Hubbard | Mar. 27, 1951 |

FOREIGN PATENTS

| | | |
|---|---|---|
| 365,861 | Germany | of 1922 |
| 448,756 | Germany | Aug. 27, 1927 |